United States Patent
Choi et al.

(10) Patent No.: US 9,169,649 B2
(45) Date of Patent: Oct. 27, 2015

(54) PHOTOVOLTAIC MODULE ATTACHED TO GUARDRAIL

(75) Inventors: Chul June Choi, Daejeon (KR); Dong Hun No, Cheongju-si (KR); Hyun Young Cho, Daejeon (KR)

(73) Assignee: LG HAUSYS, LTD., Seoul (KR)

( * ) Notice: Subject to any disclaimer, the term of this patent is extended or adjusted under 35 U.S.C. 154(b) by 845 days.

(21) Appl. No.: 13/390,245

(22) PCT Filed: Sep. 3, 2010

(86) PCT No.: PCT/KR2010/005991
§ 371 (c)(1),
(2), (4) Date: Feb. 13, 2012

(87) PCT Pub. No.: WO2011/037336
PCT Pub. Date: Mar. 31, 2011

(65) Prior Publication Data
US 2012/0138549 A1    Jun. 7, 2012

(30) Foreign Application Priority Data

Sep. 23, 2009 (KR) .......... 10-2009-0090192
May 11, 2010 (KR) .......... 10-2010-0043941

(51) Int. Cl.
*F24J 2/54*   (2006.01)
*E04F 10/08*  (2006.01)
*H01L 31/042* (2014.01)
*E04F 11/18*  (2006.01)

(52) U.S. Cl.
CPC ............... *E04F 10/08* (2013.01); *H02S 20/00* (2013.01); *E04F 2011/1878* (2013.01); *F24J 2/541* (2013.01); *F24J 2/5431* (2013.01); *Y02B 10/10* (2013.01); *Y02B 10/20* (2013.01); *Y02E 10/50* (2013.01)

(58) Field of Classification Search
CPC ............. E04F 10/08; E04F 2011/1876; E04F 2011/1878; F24J 2/0427; F24J 2/5203; F24J 2/541; F24J 2002/0038; F24J 2002/0069; F24J 2002/0076; H01L 31/0422; H02S 20/22; H02S 20/30
USPC .......... 211/41.1, 129.1, 131.2, 144, 150, 164, 211/169.1, 170; 248/214, 240, 242
See application file for complete search history.

(56) References Cited

U.S. PATENT DOCUMENTS 4,022,184 A * 5/1977 Anderson ............ 126/573
4,026,269 A * 5/1977 Stelzer ............... 126/702
4,079,725 A * 3/1978 Chadick .............. 126/601

(Continued)

FOREIGN PATENT DOCUMENTS

CA    2345588 A1 * 10/2001
GB    1566797 A  *  5/1980

(Continued)

*Primary Examiner* — Joshua Rodden
(74) *Attorney, Agent, or Firm* — Nath, Goldberg & Meyer; Joshua B. Goldberg

(57) ABSTRACT

Provided herein is a sunlight generated power device having an upper fixing frame, a lower fixing frame, a main link, and a sub link, which together form a four bar link, and an actuator. The power device may be used to form a photovoltaic module installed at a building, bridge, park, and the like. Solar cell panels positioned on the power device are easily adjustable to enhance photovoltaic efficiency. The power device may also be constructed to display a luxurious image by providing an elegant appearance.

6 Claims, 6 Drawing Sheets

(56) References Cited

U.S. PATENT DOCUMENTS

2006/0202186 A1* 9/2006 Rowley et al. .................. 256/67
2014/0116497 A1* 5/2014 Sanders ........................ 136/246

FOREIGN PATENT DOCUMENTS

| | | |
|---|---|---|
| JP | S62113638 A | 5/1987 |
| JP | H08170790 A | 7/1996 |
| JP | 10-140943 A | 5/1998 |
| JP | 2002-121874 * | 4/2002 |
| JP | 2002-121874 A | 4/2002 |
| JP | 2002-173913 A | 6/2002 |
| JP | 3091001 U | 1/2003 |
| JP | 2003533893 A | 11/2003 |
| JP | 3129362 U | 1/2007 |
| JP | 2009-10324 A | 1/2009 |
| KR | 20-0431864 Y1 | 11/2006 |
| KR | 10-0841573 B1 | 6/2008 |

* cited by examiner

PHOTOVOLTAIC MODULE ATTACHED TO GUARDRAIL

This is a National Phase Application filed under 35 U.S.C. 371 as a national stage of PCT/KR2010/005991, filed Sep. 3, 2010, and claiming the benefit from Korean Application No. 10-2009-0090192, filed Sep. 3, 2009, and Application No. 10-2010-0043941, filed May 11, 2010, the content of each of which is hereby incorporated by reference in its entirety.

TECHNICAL FIELD

The present invention relates to a solar cell system, and more particularly to a guardrail-mount type photovoltaic module, which may generate photovoltaic power in a state of being attached to a guardrail installed on a roof or veranda of a building or similar construction or to a guiderail installed on a park, pedestrian bridge or similar construction, while providing an improved appearance to constructions to which the solar cell panel is mounted.

BACKGROUND ART

In recent years, concern about development of environmentally friendly alternative energy sources and diversification of future energy sources has become an international issue due to fossil fuel depletion, and solar batteries based on solar energy have attracted attention as alternative energy sources.

Generally, photovoltaic power generation uses characteristics of semiconductors to convert light energy into electrical energy, in which direct current (DC) generated by a solar battery is converted into alternating current (AC) in order to supply domestic electrical power. However, the photovoltaic power generation has such weak electromotive force that plural units, i.e. unit solar-battery modules, are connected to each other on a plate to produce a suitable electromotive force and may mostly be integrated, particularly, into constructions, such as buildings, houses or the like.

The minimum unit of a solar battery is called a cell, but the solar cell is rarely used as a unit cell in practice. Since a single cell generates a voltage of about 0.5 V, which is much lower than the several to hundreds of volts required in practical use, plural unit solar batteries are connected in series or in parallel according to desired unit capacity. To protect the plural cells connected according to desired unit capacity, the plural cells are packaged to constitute a solar cell panel. Electricity produced by the solar cell panel is supplied to buildings or the like.

In the related art, a solar cell panel is simply attached to a roof or outer wall of a construction, causing deterioration in an outer appearance of the construction. Further, since the conventional solar cell panel can be attached only to a roof or an outer wall, there is a limit in application ranges of solar cells. Further, the solar cell panel is configured to absorb sunlight to produce electricity, and it is thus advantageous to arrange the solar cell panel as perpendicular to sunlight as possible. However, it is difficult to mount the conventional solar cell panel to be varied perpendicularly to sunlight.

DISCLOSURE

Technical Problem

The present invention is directed to solving the problems of the related art, and provides a method of installing a solar cell panel at various positions on a building or other constructions while providing an improved appearance to constructions to which the solar cell panel is mounted.

Technical Solution

In accordance with an aspect of the invention, a guardrail-mount type photovoltaic module includes: an upper fixing frame 40 rotatably mounted on an upper shaft 30 attached to a guardrail 10; a lower fixing frame 60 rotatably mounted on a lower shaft 50 disposed below the upper shaft 30 to be parallel with the upper shaft 30; a main link 80 mounted at one end thereof on the upper shaft 30 and at the other end thereof on the lower shaft 50; a sub link 90 mounted at one end thereof on the upper fixing frame 40 and at the other end thereof on the lower fixing frame 60; and an actuator mounted at one end thereof on the lower shaft.

A solar cell panel may be mounted on each of the upper fixing frame and the lower fixing frame and angles between the ground and the solar cell panels respectively mounted on the upper and lower fixing frames may be equal.

The angle between the ground and the solar cell panel mounted on each of the upper and lower fixing frames may be varied as the one end of the actuator presses the lower shaft.

The photovoltaic module may further include a rotation link which is coupled at one end thereof to the lower fixing frame and at the other end thereof to the guardrail, or a bracket 20 secured to the guardrail and formed with a through-hole, to which the upper shaft is mounted while passing therethrough.

The upper fixing frame, the lower fixing frame, the main link, and the sub link may constitute a four-bar link.

Advantageous Effects

According to embodiments of the present invention, a photovoltaic module is mounted on a guardrail provided to a building, a bridge, a park, and the like, so that a solar cell panel can be installed at various positions of a construction. In addition, the solar cell panel allows easy adjustment of an angle between the solar cell panel and sunlight, thereby enhancing photovoltaic efficiency. Further, a construction provided with the solar cell panel may have a luxurious appearance.

BEST MODE

Next, exemplary embodiments of the present invention will be described in more detail with reference to accompanying drawings.

A photovoltaic module according to one exemplary embodiment of the invention may be mounted on a guardrail. Generally, the 'guardrail' refers to a member made of metal, wood or stone and serving to guard people from falling at an edge of a roof, a veranda or a staircase of a building while decorating the building. Further, as used herein, the term "guardrail" also includes a variety of members which can be installed at a proper height in places such as parks, amusement parks, pedestrian bridges, etc., or other constructions, to obstruct movement and entrance of pedestrians. Herein, the guardrail installed to a veranda of a building will be described as an example.

Figure 1:
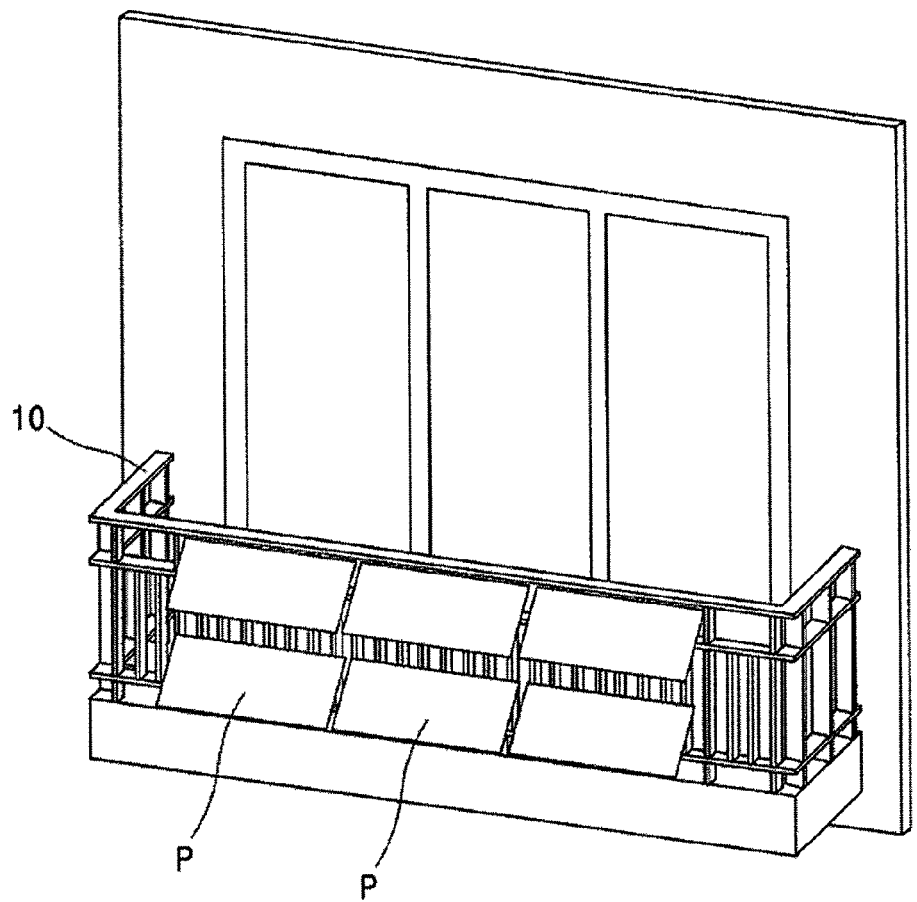
FIG. 1 shows a guardrail-mount type photovoltaic module according to one exemplary embodiment of the present invention, which is attached to a guardrail of a building.
Figure 2:
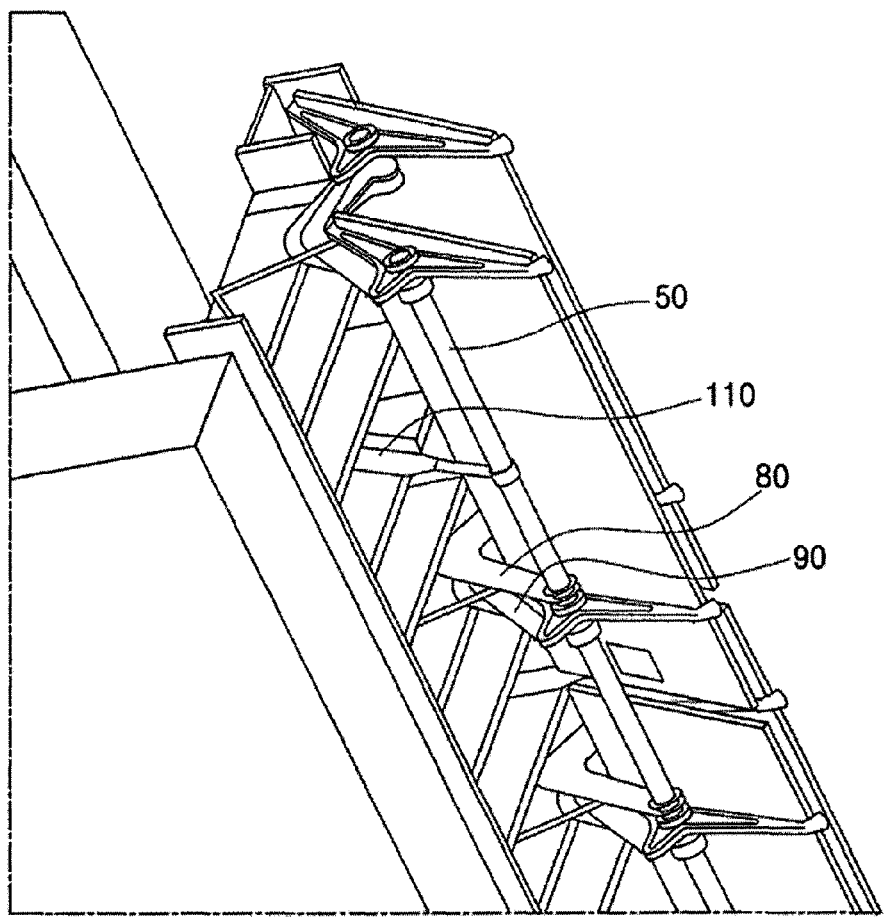
FIGS. 2 and 3 show the photovoltaic module of FIG. 1, when viewed from a lower side of the photovoltaic module.
Figure 3:
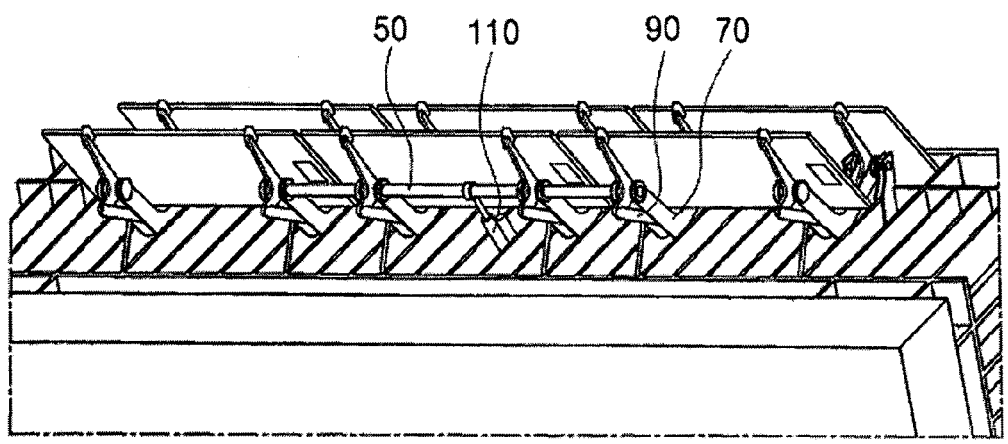
Figure 4:
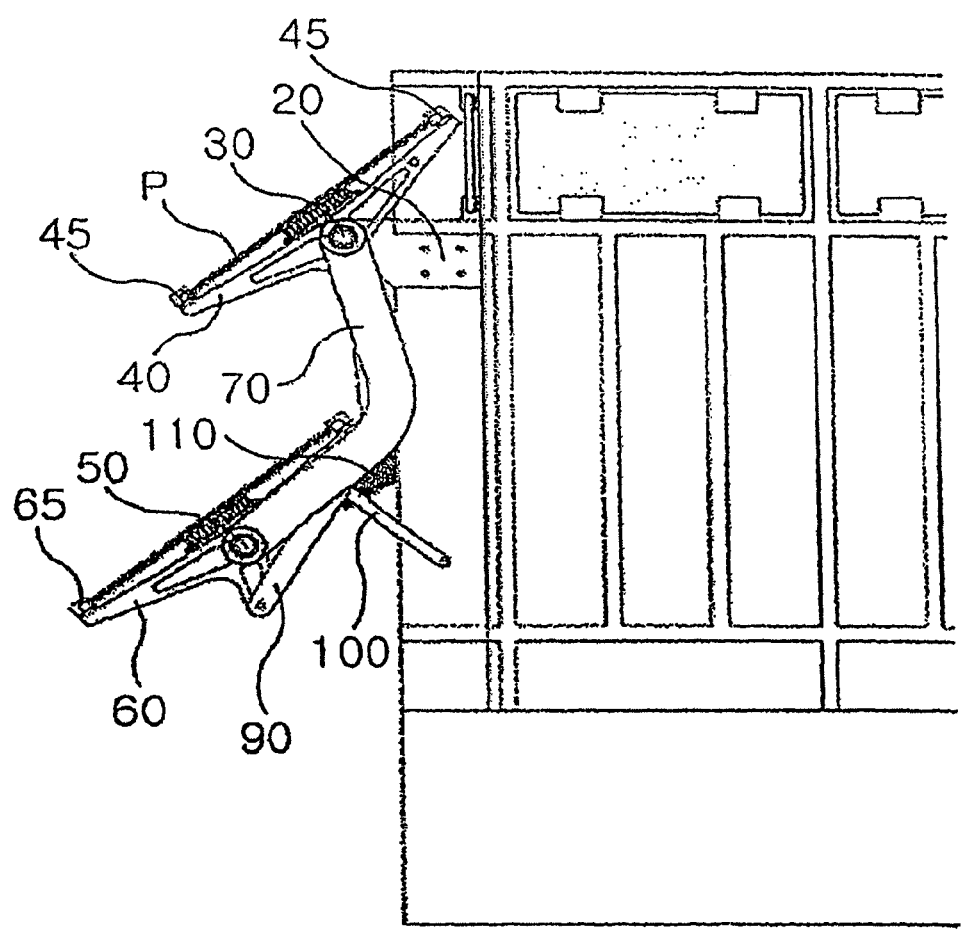
FIG. 4 is a partially cut-away view of the photovoltaic module of FIG. 1, when viewed at the right of the photovoltaic module.
Figure 5:
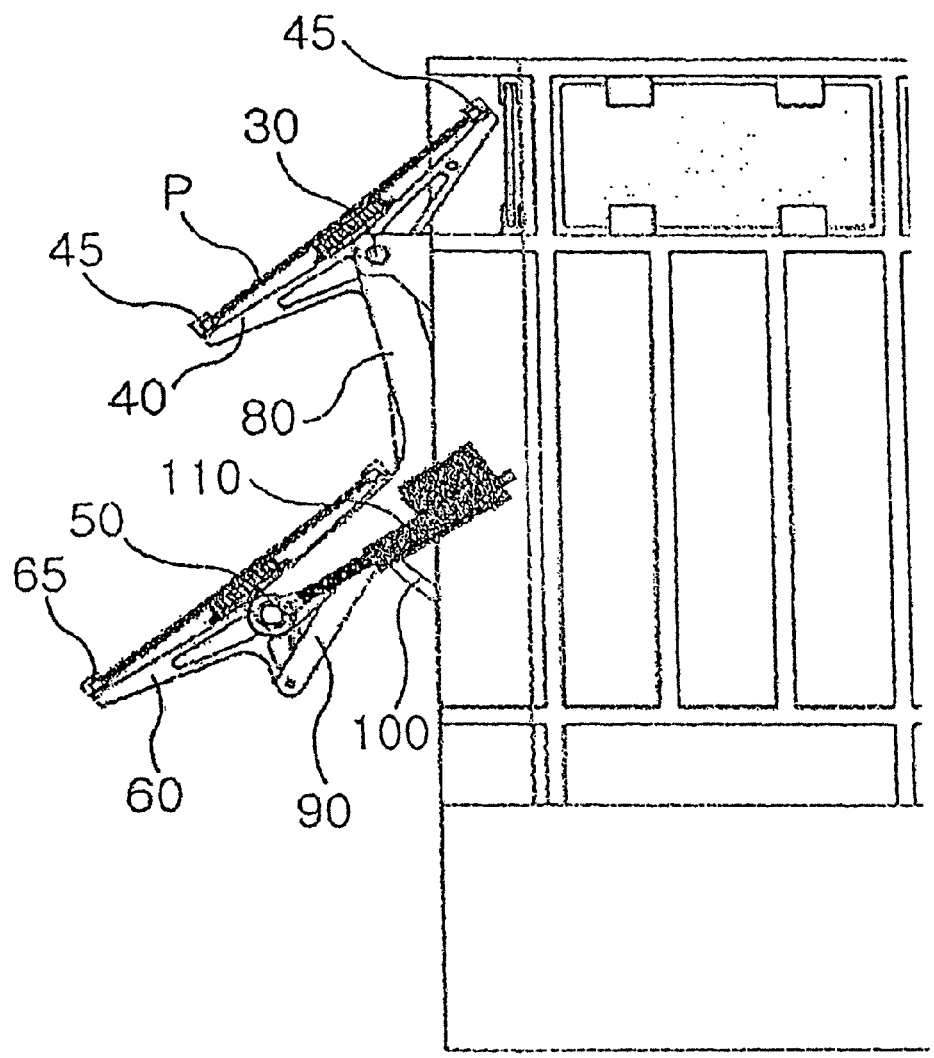
FIG. 5 is a side view of the photovoltaic module of FIG. 4, from which a right main link is removed.
Figure 6:
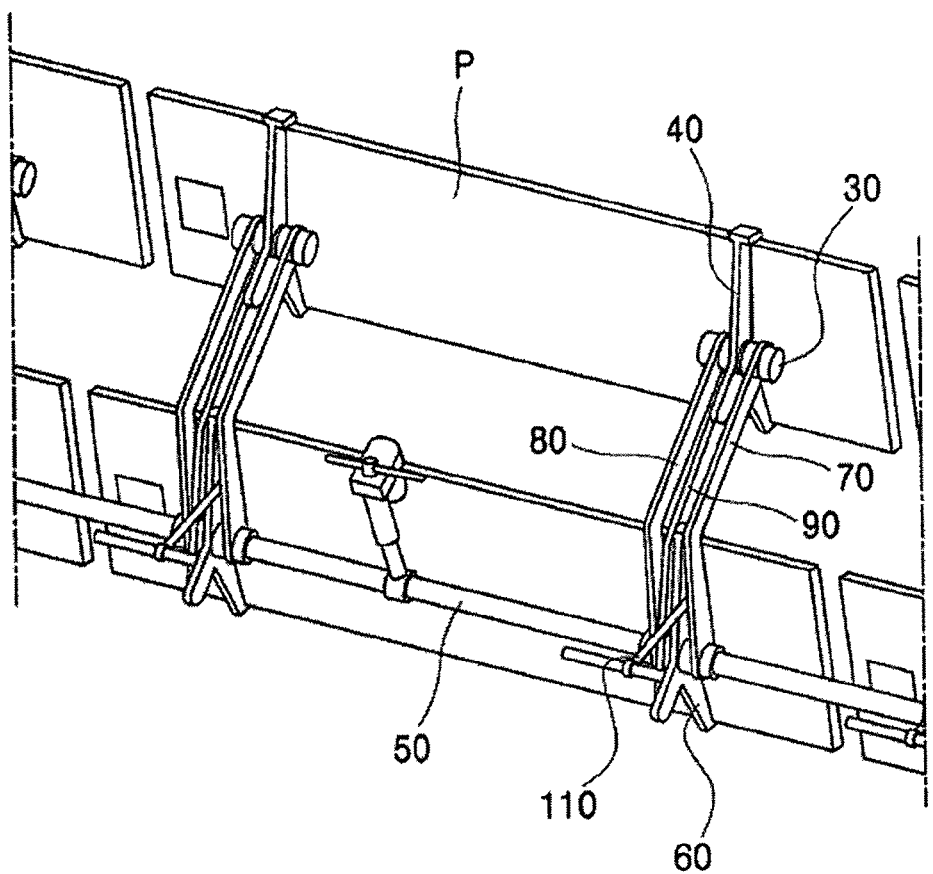
FIG. 6 shows some components of the guardrail-mount type photovoltaic module according to the exemplary embodiment of the present invention.

FIG. 1 shows a guardrail-mount type photovoltaic module according to one exemplary embodiment of the present invention, which is attached to a guardrail of a building; FIGS. 2 and 3 show the photovoltaic module of FIG. 1, when viewed from a lower side of the photovoltaic module; FIG. 4 is a partially cut-away view of the photovoltaic module of FIG. 1, when viewed from the right of the photovoltaic module; FIG. 5 is a side view of the photovoltaic module of FIG. 4, from which a right main link is removed; and FIG. 6 shows some components of the guardrail-mount type photovoltaic module according to the exemplary embodiment of the invention.

In a guardrail-mount type photovoltaic module according to one exemplary embodiment, a bracket 20 is attached to a guardrail 10 by fixing members such as bolts and the like, and is formed with an opening, to which an upper shaft 30 is mounted, such that the upper shaft 30 is mounted on the bracket 20 through the opening. Further, an upper fixing frame 40 is rotatably attached to the upper shaft 30, with a solar cell panel P firmly mounted on the upper fixing frame 40. The upper fixing frame 40 is provided at upper and lower portions thereof with fixing members 45 to secure the solar cell panel P to the upper fixing frame 40.

Further, a lower fixing frame 60 having the same shape as the upper fixing frame 40 is disposed below the upper fixing frame 40. Like the upper fixing frame 40, a solar cell panel P is mounted on the lower fixing frame 60. The upper and lower fixing frames 40, 60 are configured such that planes having the solar cell panels mounted thereon are parallel with each other. Further, the solar cell panels are kept parallel with each other even in the case where an angle of each of the solar cell panels to the ground is varied and thus the angles of the solar cell panels mounted on the upper and lower fixing frames 40, 60 are varied.

According to this embodiment, main links 70, 80 and a sub link 90 are provided for linking the upper fixing frame 40 and the lower fixing frame 60 with each other. The main links 70, 80 include a right main link 70 arranged on the right side of the sub link 90 and a left main link 80 arranged on the left side of the sub link 90.

Each of the main links 70, 80 is coupled at one end thereof to the upper shaft 30 and rotatably coupled at the other end thereof to the lower shaft 50. Further, the sub link 90 is coupled at one end thereof to the upper fixing frame 40, and rotatably coupled at the other end thereof to the lower fixing frame 60. The sub link 90 is coupled to a portion of the upper fixing frame 40 protruding a predetermined distance from the upper shaft 30 of the upper fixing frame 40, and is also coupled to a portion of the lower fixing frame 60 protruding a predetermined distance from the lower shaft 50 of the lower fixing frame 60.

With this configuration, the upper fixing frame 40, the lower fixing frame 60, the main links 70, 80 and the sub link 90 constitute a four-bar link. On the principle of the four-bar link, the upper fixing frame 40 and the lower fixing frame 60 are operated in a state of being parallel with each other, so that the solar cell panels mounted thereon may be kept parallel with each other. Further, an actuator 110 is coupled at one end thereof to the lower shaft 50 for transmission of power for operation of the four-bar link, and a rotation link 100 is provided for proper restriction during operation of the four-bar link. The actuator 110 is coupled at one end thereof to the lower shaft 50 and at the other end thereof to a proper position of the guardrail. The rotation link 100 is rotatably coupled at one end thereof to the lower fixing frame 60, and at the other end to the guardrail.

In the four-bar link constituted by the upper fixing frame 40, the lower fixing frame 60, the main links 70, 80 and the sub link 90, the lower shaft 50 is moved by the actuator 110, while being properly restricted in operating direction by the rotation link 100, which is coupled to the lower fixing frame 60. At this time, the upper fixing frame 40 and the lower fixing frame 60 are moved while being maintained at the same angle with respect to each other by an operating principle of the four-bar link, so that the solar cell panels mounted thereon may also move while being maintained at the same angle with respect to each other. Accordingly, it is possible to control the angle of the solar cell panel relative to the ground by adjusting an operating distance of the actuator 110 mounted on the lower shaft 50.

The accompanying drawings show that the actuator operates to provide a predetermined angle between each of the solar cell panels and the guardrail (i.e. a right angle between the solar cell panel and the sun) in order to produce electric power using sunlight. Since the sun moves, the actuator may be controlled to adjust the angles of the solar cell panels by taking movement of the sun into account. Further, if the solar cell panel does not produce electric power during the night or if for the purposes of aesthetics, the actuator may be operated so that the solar cell panels can be folded up toward the guardrail and be parallel with the guardrail.

The invention claimed is:

1. A guardrail-mount type photovoltaic module comprising:
    an upper fixing frame rotatably mounted on an upper shaft attached to a guardrail;
    a lower fixing frame rotatably mounted on a lower shaft disposed below the upper shaft to be parallel with the upper shaft:
    a left main link having two ends, with one of the two ends mounted on the upper shaft and another one of the two ends mounted on the lower shaft;
    a right main link having two ends, with one of the two ends mounted on the upper shaft and another one of the two ends mounted on the lower shaft,
    a sub link having two ends, with one of the two ends mounted on the upper fixing frame and another one of the two ends mounted on the lower fixing frame, wherein the left main link is arranged on one side of the sub link and the right main link is arranged on another side of the sub link; and
    an actuator mounted at one end thereof on the lower shaft, wherein the upper fixing frame, the lower fixing frame, the left and right main links, and the sub link constitute a four-bar link.

2. The photovoltaic module of claim 1, wherein a solar cell panel is mounted on each of the upper fixing frame and the lower fixing frame.

3. The photovoltaic module of claim 2, wherein angles between a ground and the solar cell panels respectively mounted on the upper and lower fixing frames are the same.

4. The photovoltaic module of claim 3, wherein the angle between the ground and the solar cell panel mounted on each of the upper and lower fixing frames is varied as the one end of the actuator presses the lower shaft.

5. The photovoltaic module of claim 1, further comprising: a rotation link having two ends, one of the two ends coupled to the lower fixing frame and another one of the two ends coupled to the guardrail.

6. The photovoltaic module of claim 1, further comprising: a bracket secured to the guiderail and formed with a through-hole to which the upper shaft is mounted while passing therethrough.

\* \* \* \* \*